(12) United States Patent
Neustel

(10) Patent No.: US 8,036,493 B1
(45) Date of Patent: Oct. 11, 2011

(54) METHOD FOR CORRECTING ORIENTATION OF PATENT FIGURES

(76) Inventor: Michael S. Neustel, Fargo, ND (US)

( * ) Notice: Subject to any disclaimer, the term of this patent is extended or adjusted under 35 U.S.C. 154(b) by 1232 days.

(21) Appl. No.: 11/692,188

(22) Filed: Mar. 27, 2007

Related U.S. Application Data

(60) Provisional application No. 60/743,794, filed on Mar. 27, 2006.

(51) Int. Cl.
*G06K 9/32* (2006.01)
*G09G 5/00* (2006.01)

(52) U.S. Cl. ........................................ 382/297; 345/658

(58) Field of Classification Search .......... 382/296–297, 382/305, 312, 317, 321; 345/649, 658, 659; 358/505

See application file for complete search history.

(56) References Cited

U.S. PATENT DOCUMENTS

| | | | | |
|---|---|---|---|---|
| 4,658,430 A | * | 4/1987 | Anderson et al. | 382/297 |
| 6,148,149 A | * | 11/2000 | Kagle | 396/50 |
| 6,545,666 B1 | * | 4/2003 | Culler | 345/168 |
| 2005/0210009 A1 | * | 9/2005 | Tran | 707/3 |

* cited by examiner

*Primary Examiner* — Kanjibhai Patel
(74) *Attorney, Agent, or Firm* — Michael S. Neustel

(57) ABSTRACT

A method for correcting orientation of patent figures for efficiently reviewing and analyzing a patent document (e.g. patent application, published patent document or patent). The method for correcting orientation of patent figures includes acquiring a patent image file for a patent document, identifying the Figure Page(s) in the patent image, determining what Figure Page(s) were originally prepared in a "landscape" orientation, and modifying the Landscape Pages to be in a landscape orientation thereby rotating the Figure Page clockwise 90 degrees.

10 Claims, 8 Drawing Sheets

Modifying Orientation of Figure(s)
Originally in Landscape Orientation

Modifying Orientation of Figure(s)
Originally in Landscape Orientation

Identifying and Modifying "Landscape Figures"

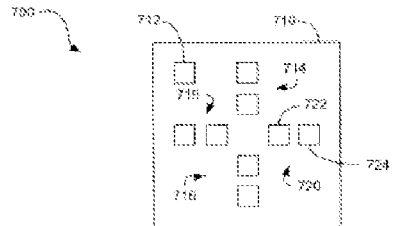
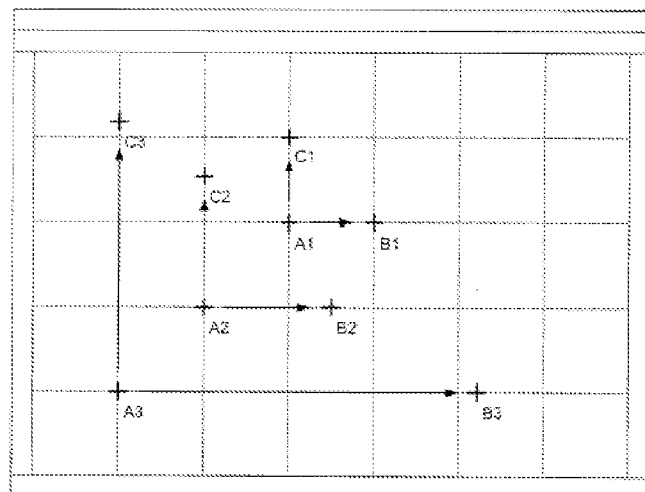
FIG. 5

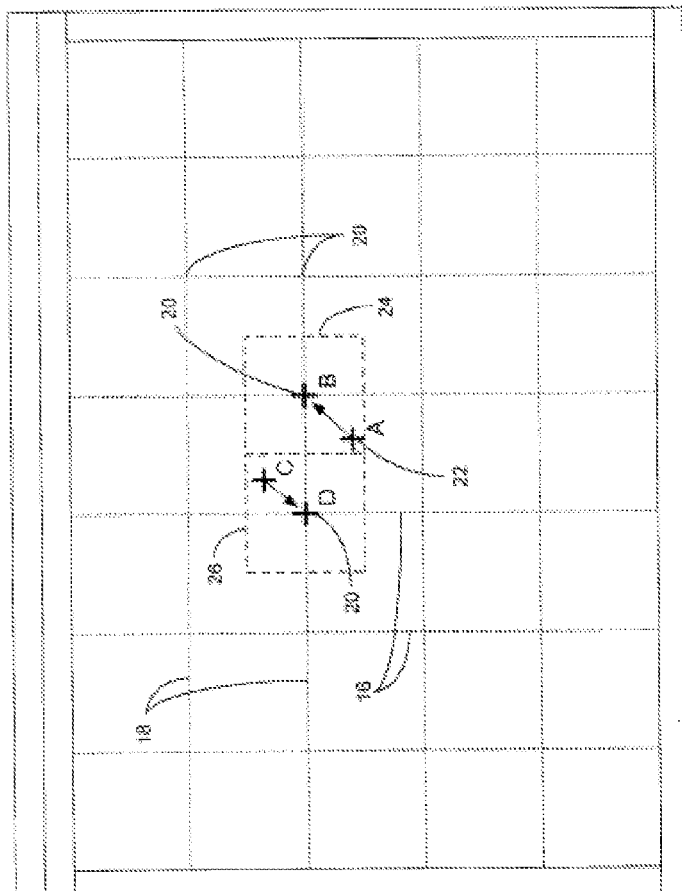

METHOD FOR CORRECTING ORIENTATION OF PATENT FIGURES

CROSS REFERENCE TO RELATED APPLICATIONS

I hereby claim benefit under Title 35, United States Code, Section 119(e) of U.S. provisional patent application Ser. No. 60/743,794 filed Mar. 27, 2006. The 60/743,794 application is currently pending as of the filing of this application. The 60/743,794 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to patent images and more specifically it relates to a method for correcting orientation of patent figures for increasing the efficiency of reviewing the figures of a patent.

2. Description of the Related Art

Any discussion of the prior art throughout the specification should in no way be considered as an admission that such prior art is widely known or forms part of common general knowledge in the field. Current patent imaging systems do not utilize page rotation technology.

BRIEF SUMMARY OF THE INVENTION

The present invention generally comprises identifying the element names within a patent document and modifying patent drawing sheets to include element names and figure descriptions.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a method for correcting orientation of patent figures that will overcome the shortcomings of the prior art systems.

A second object is to provide a method for correcting orientation of patent figures for efficiently reviewing and analyzing a patent document (e.g. patent application, published patent document or patent).

Another object is to provide a method for correcting orientation of patent figures that reduces the amount of time required to review and analyze a patent document.

An additional object is to provide a method for correcting orientation of patent figures that reduces the amount of time required to review and analyze the figures of a patent document.

A further object is to provide a method for correcting orientation of patent figures that corrects both electronic images of patents (e.g. PDF, TIFF) and/or printed images of patents to ensure that all pages are in a portrait orientation.

A further object is to provide a method for correcting orientation of patent figures that may be utilized to correct various types of patent documents including but not limited to non-filed patent applications, filed patent applications, published patent applications, and granted patents.

A further object is to provide a method for correcting orientation of patent figures that is able to analyze various formats of patent data including but not limited to HTML, XML, text, TIFF and PDF.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 5 is a magnified view of page 6 of U.S. Pat. No. 6,545,666 after being modified to the landscape orientation.

FIG. 7 is a view of page 2 of U.S. Pat. No. 6,545,666 showing the header information surrounded by a dashed line.

DETAILED DESCRIPTION OF THE INVENTION

A. Introduction

Figure 1:
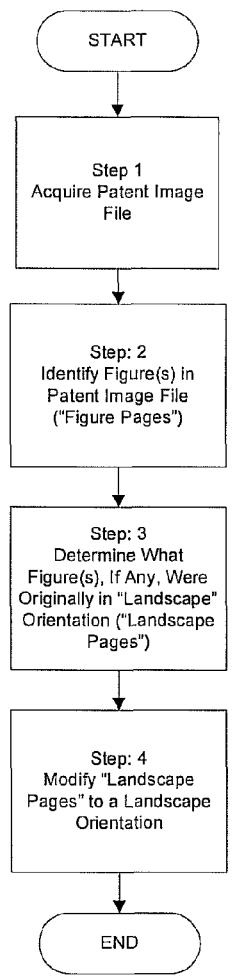
FIG. 1 is a flowchart illustrating the overall process of the present invention of acquiring a patent image file for a patent document, identifying the Figure Page(s) in the patent image, determining what Figure Page(s) were originally prepared in a "landscape" orientation, and modifying the Landscape Pages to be in a landscape orientation thereby rotating the Figure Page clockwise 90 degrees.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The present invention may be operated as a computer program installed upon a download computer, via a website or other system. It can be also appreciated that even though the description below is about downloading, searching and managing electronic patent files, the present invention may also be utilized for downloading, searching and managing electronic trademark files.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

B. Exemplary Global Computer Network

The global computer network (e.g. Internet) is an exemplary communications network for the present invention. The Internet is basically comprised of a "global computer network." A plurality of computer systems around the world are in communication with one another via this global computer network and are able to transmit various types of data between one another. The communications between the computer systems may be accomplished via various methods such as but not limited to wireless, Ethernet, cable, direct connection, telephone lines, and satellite. One or more web servers typically provide the data to the computer systems connected via the Internet.

The present invention may also be utilized upon global computer networks, local area networks (LAN), wide area networks (WAN), campus area networks (CAN), metropolitan-area networks (MAN), and home area networks (HAN). Various protocols may be utilized by the electronic devices for communications such as but not limited to HTTP, SMTP, FTP and WAP (Wireless Application Protocol). The present invention may be implemented upon various wireless networks such as but not limited to CDPD, CDMA, GSM, PDC, PHS, TDMA, FLEX, REFLEX, IDEN, TETRA, DECT, DATATAC, and MOBITEX. The present invention may also be utilized with online services and internet service providers such as AMERICA ONLINE (AOL), COMPUSERVE, WEBTV, and MSN INTERNET SERVICES. The present invention preferably utilizes the Internet for transmitting data, however it can be appreciated that as future technologies are created that various aspects of the invention may be practiced with these improved technologies.

The present invention is preferably embodied within a software application installed upon the download computer. However, the present invention may be embodied in various other manners such as but not limited to a central server computer or a web server that merely provide the results of the analyzed patent data. The present invention may also be implemented at the government patent office when a patent document is scanned into their system or by a patent applicant when filing electronic patent applications to ensure that all of the figures regardless of their original orientation are shown with all the text readable in a horizontal state.

C. Patent Documents

Patent documents may be comprised of various documents including but not limited to non-filed patent applications, filed patent applications, published patent applications, granted patents, patent certificates and patent file wrappers. Downloading patent files (image and/or text) from patent websites (e.g. www.uspto.gov, ep.espacenet.com/) via a global computer network is well known in the art. The patent files may be comprised of issued patents, published applications or related patent data. Various software programs (e.g. PATENTHUNTER sold by PatentWizard, LLC) and websites currently allow for the downloading of patent files from patent websites.

The patent documents are in a computer readable file format and may be available directly from the computer or via downloading through the global computer network. For example, a user may analyze the text of a MICROSOFT WORD document containing a patent application or an HTML file downloaded from the global computer network. Various other file formats may be analyzed with the present invention.

C. Figure Correction of Patent Documents i. Patent Documents

A patent document is typically stored on a web server or the user's computer in an image file format such as but not limited to PDF (Portable Document Format) or TIFF (Tagged Image File Format). The patent document may then be viewed electronically using a conventional image viewer (e.g. ADOBE ACROBAT). Since many patent documents include some or all figures drawn in a "landscape" position the images are displayed in a manner that is rotated counter-clockwise 90 degrees making it difficult to review the figure when electronically shown. In addition, when the patent document is printed these same figures are printed in landscape position making it further difficult to review the patent figures of the patent.

For example, pages 2 and 6 of U.S. Pat. No. 6,545,666 are in a landscape orientation while the other pages are in a regular "portrait" orientation. Pages 1, 3-5, 7-11 of U.S. Pat. No. 6,545,666 are in the portrait orientation and are easy to view both in an electronic format in an image viewer and in a printed copy. The text, element numbers, figures and the figure indicia for these patents are all orientated in a horizontal manner which is traditionally how text and images are viewed.

Figure 8:
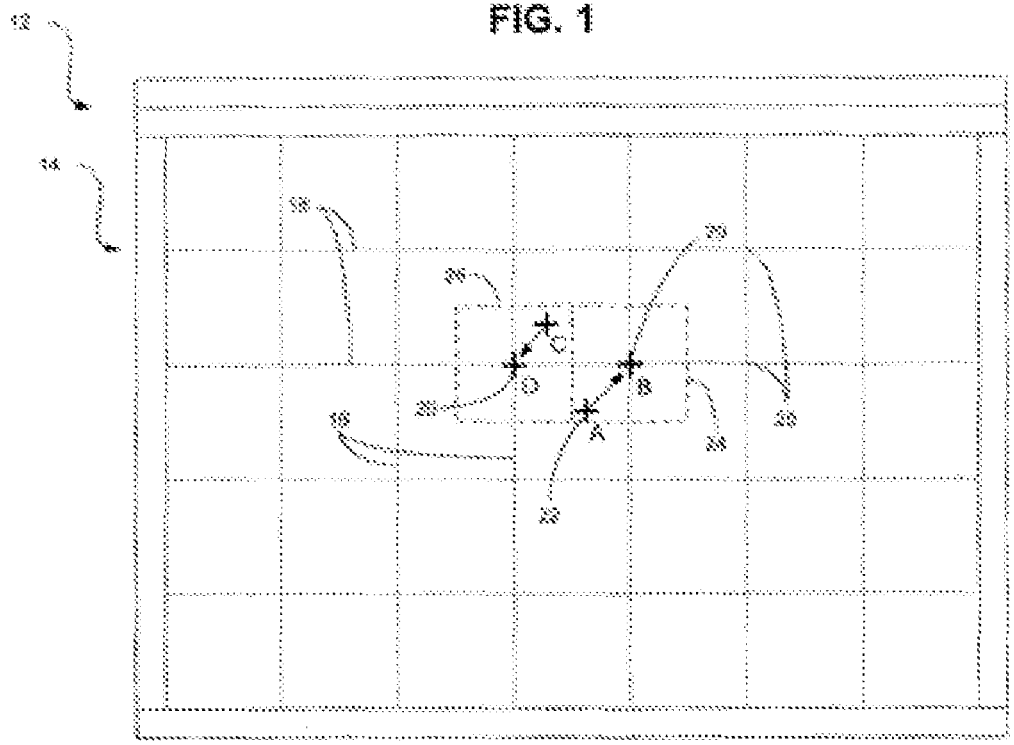
FIG. 8 is a view of page 2 reformatted so that the image within is rotated counterclockwise 90 degrees in the replacement page for page 2.

However, pages 2 and 6 which comprise FIGS. 1 and 8 respectively of U.S. Pat. No. 6,545,666 are originally in a "landscape" orientation, but they were scanned by the U.S. Patent & Trademark Office in the "portrait" orientation making it increasingly difficult to view these two figures both electronically and in print. The electronic file image is set to the "portrait" position for all of the pages of U.S. Pat. No. 6,545,666 despite FIGS. 1 and 8 thereof actually being in an original landscape position.

ii. Identifying "Figure Pages"

As shown in FIG. 1, the present invention first acquires the patent image file which may be in a PDF, TIFF or other file format. The original patent image file may have to be converted to a different file format to facilitate an efficient OCR process of the patent image file (the patent image file may later be converted back to the original file format or a different file format).

Once the patent image file is acquired, the pages of the patent document containing the figure(s) are first identified using a conventional OCR (optical character recognition) process. Various file formats may be used (e.g. TIFF, PDF) for the OCR process, however it is preferable that the TIFF file format be utilized which requires the conversion of other file formats to TIFF. The first page of the patent document can typically be skipped since the cover page of United States patents is always in a portrait position with all of the text and the exemplary figure in an easy to read horizontal aligned format.

During the OCR process, the header of the pages containing one or more figures typically have a "figure identifier" such as "Sheet _ of _" or other indicator information along with other identifying information. The text portions of a patent document typically do not have this header identification information at the top of their pages, so this information is used to identify the drawing sheets of a patent document. Other methods may be used to identify the drawing sheets such as (1) identifying the first set of pages with little text in them, (2) identifying the first set of pages with a lot of white space, (3) identifying the first set of pages with "FIG. _" on them, (4) identifying the first page containing the text BACKGROUND OF THE INVENTION (or other text used on the first textual page of the patent document) thereby the pages between the cover page and the identified page are the drawing sheets, (5) identifying where a substantial quantity of text is used indicating the start of the text pages, (6) identifying where column numbers and/or line numbers are used indicating the start of the text pages, or (7) any combination of the above.

For example, in U.S. Pat. No. 6,545,666 ("the '666 patent"), pages 2 through 6 each include "Sheet _ of 5" in their header which through an OCR process are identified as being "Figure Pages". Page 2 of the '666 patent has "Sheet 1 of 5", page 2 of the '666 patent has "Sheet 2 of 5" and so forth. The present invention identifies these pages as the Figure Pages since none of the other pages have this type of header information in them. In addition, the header of each of the Figure Pages of the '666 patent also include "U.S. Patent" text on the left side, followed by "Apr. 8, 2003" and with "U.S. Pat. No. 6,545,666" which may be utilized to identify the figure sheets since this information is not contained within the headers of the text pages of the patent document.

For older United States patents, the "Sheet _ of _" format is not utilized for drawing sheets. For example for earlier patents (e.g. U.S. Pat. No. 3,500,000) the cover page is actually one of the Figure Pages and a header format of "_ Sheets-Sheet _" is utilized. For United States patents granted in 1972 and thereafter the cover page is typically only the cover page followed by the Figure Pages which have a header format of "Sheet _ of _". The Figure Pages are identified by this header information and the program preferably only analyzes rotating the position of the Figure Pages.

Figure 2:
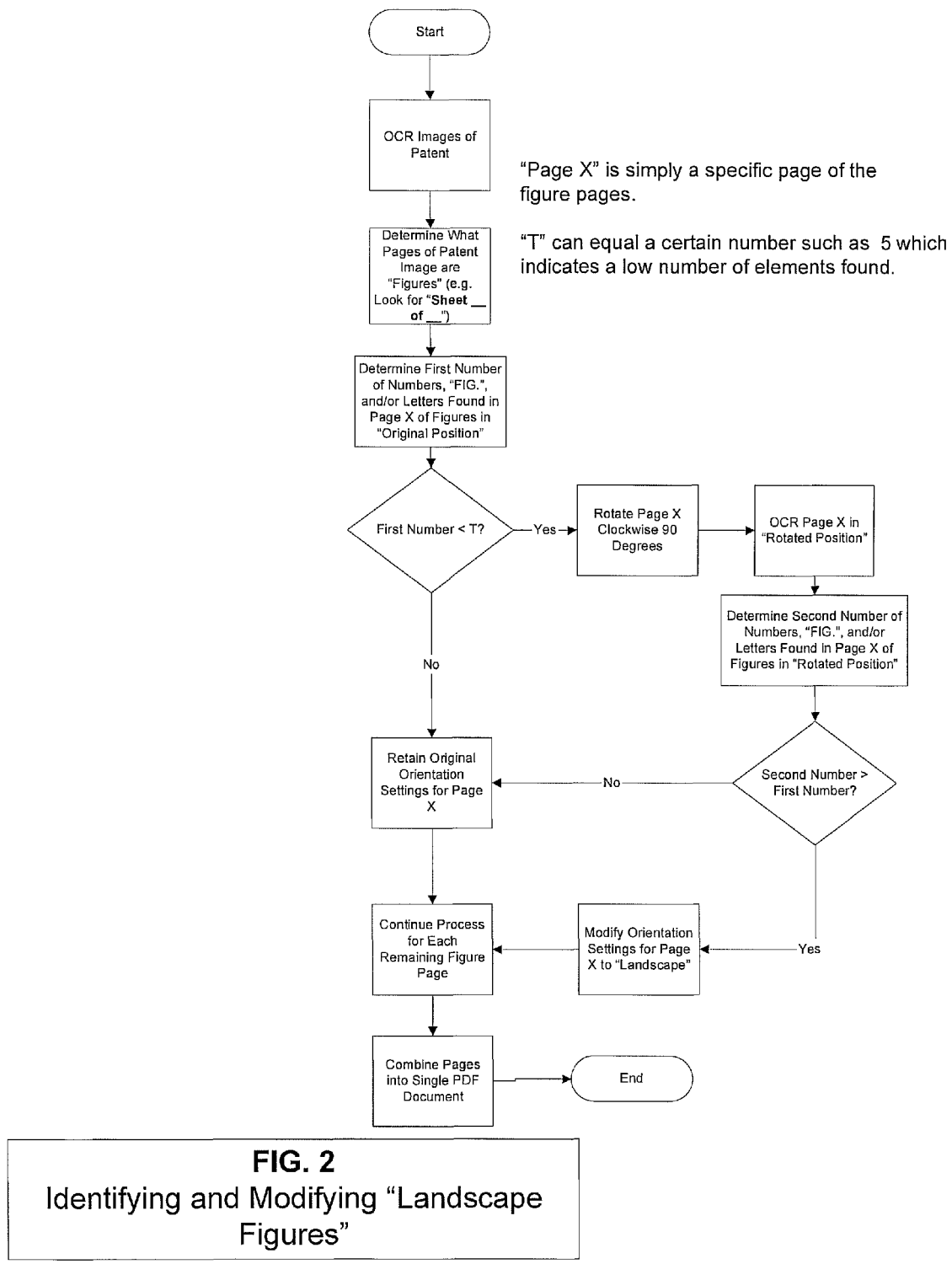
FIG. 2 is a flowchart illustrating a preferred method of identifying the "Landscape Figure Pages" that were originally prepared in a landscape orientation by utilizing an OCR process.

It should also be noted that Figure Pages are always consecutive so the present invention is able to determine a missed Figure Page by identifying the first Figure Page and the last Figure Page. For example, if page 2 of the patent document is identified as the first Figure Page, page 2 is not identified as a Figure Page but page 3 is identified as a Figure Page, the present invention simply accepts page 2 as a Figure Page since the misidentification may have resulted from an OCR issue or patent printing issue by the governmental office.

iii. Determining what Figure(s) Originally in "Landscape" and Correcting the Landscape Figure Pages Once the drawing sheets are identified, the present invention then OCR's these pages to identify the orientation of the figure labels and/or the element numbers (this process may be done simultaneously with the identification of the Figure Pages, before the same or thereafter). The present invention first does the OCR process on the Figure Pages in their normal portrait orientation as they were originally scanned by the government office. If the OCR process is able to identify a significant number of element numbers (e.g. greater than 5), a significant number of letters (e.g. greater than 5) and/or one or more figure labels (e.g. "FIG. _") then the present invention determines that the particular Figure Page is in the proper orientation as shown in FIG. 2 of the drawings. However, if a threshold level is not identified in the OCR process (or it could automatically proceed with this step regardless of what is found in the initial OCR process), the present invention then rotates the Figure Page clockwise 90 degrees and performs a secondary OCR process similar to the first process.

Figure 3:
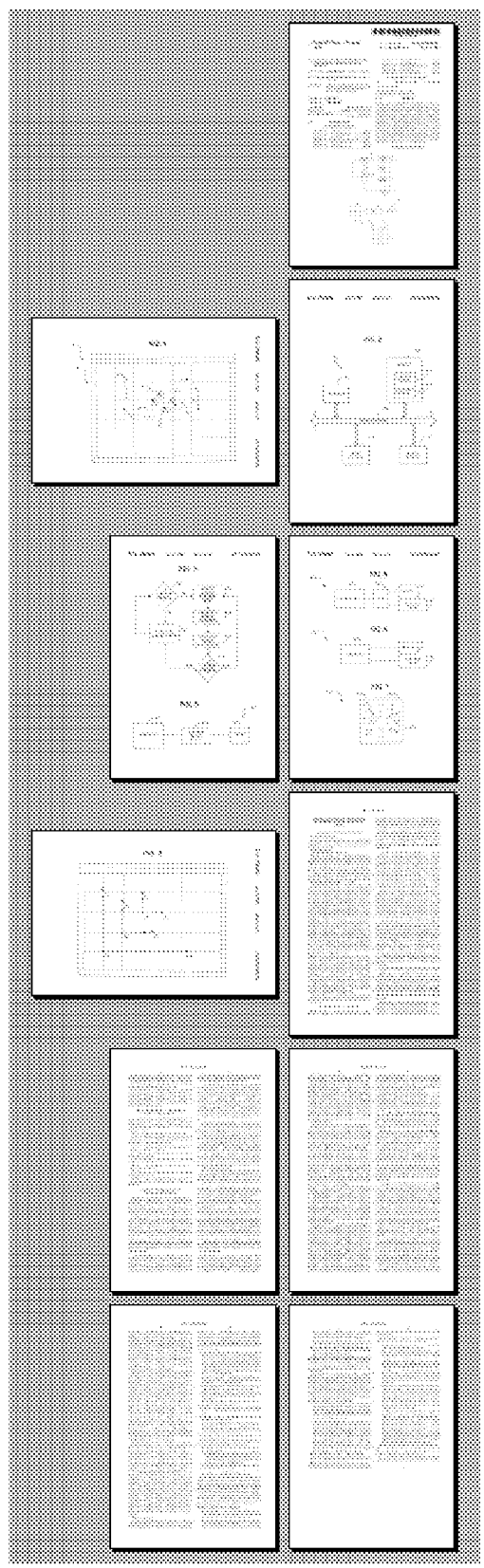
FIG. 3 is an overall view of all the pages for U.S. Pat. No. 6,545,666 after page 2 and page 6 have been modified to the "landscape" orientation.
Figure 4:
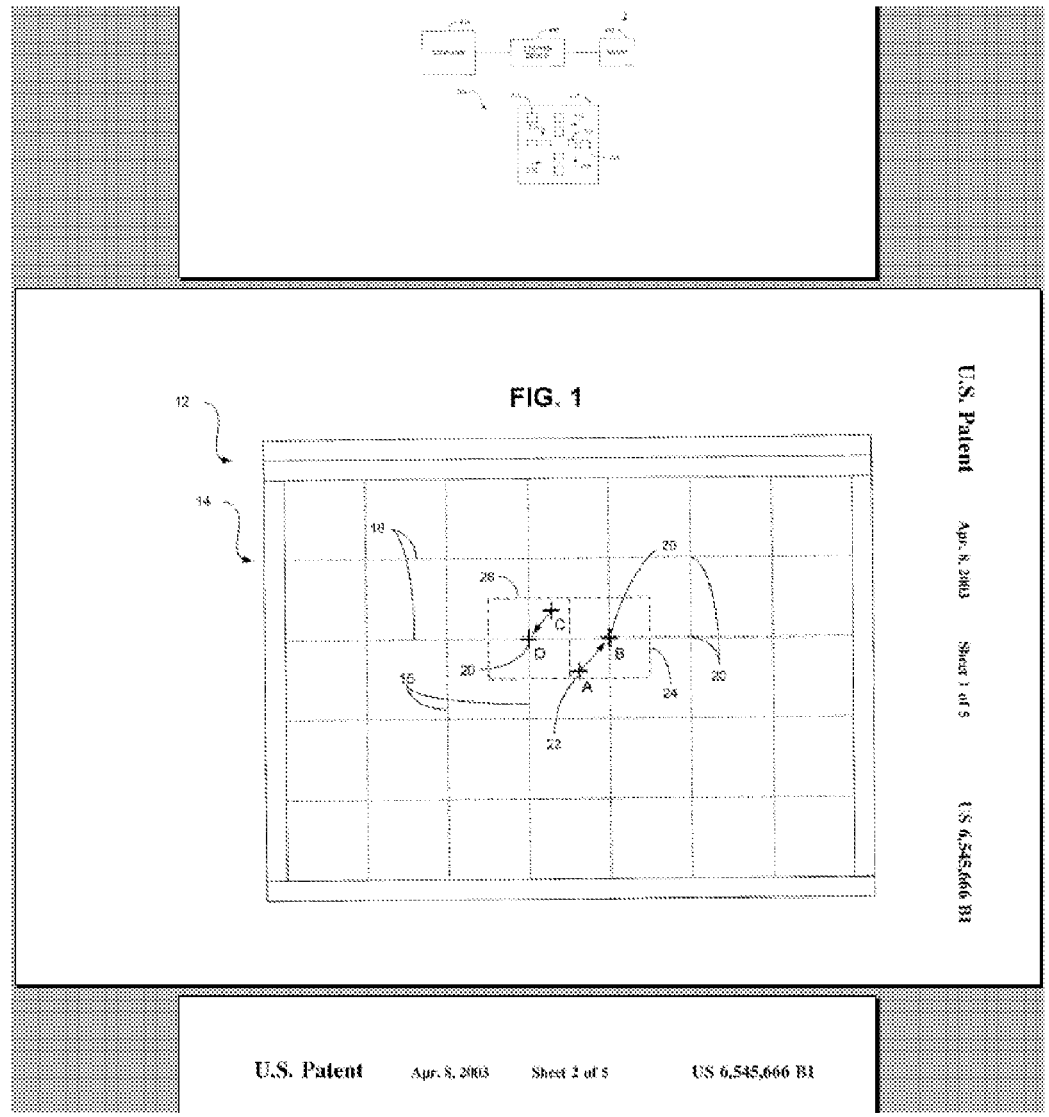
FIG. 4 is a magnified view of page 2 of U.S. Pat. No. 6,545,666 after being modified to the landscape orientation.

If the number of element numbers, letters and/or figure labels ("FIG. _") in the secondary OCR process with the Figure Page in the rotated page is greater than in the initial OCR process, the present invention determines that the Figure Page is in the wrong orientation and sets the orientation setting for the particular Figure Page to "landscape" thereby modifying the orientation of the Figure Page clockwise by 90 degrees as shown in FIGS. 3 through 5 of the drawings (in the '666 patent example). This process continues for each of the Figure Pages until all of the Figure Pages are properly orientated so they are easily viewed by a user as shown in FIG. 3 of the drawings. The patent document is thereby viewed in a conventional viewer (e.g. ADOBE ACROBAT) without the user having to manually rotate the orientation of the patent image.

In addition or alternatively, a preprocessing module may be utilized to automatically determine the page orientation for each page of the patent image (i.e. is it in a portrait or landscape position) for each of the pages of the patent document or the Figure Pages. It is well known to utilize preprocessing modules in OCR scanning to determine the page orientation prior to performing an OCR on a document. Any page of the patent document determined to be in a landscape orientation is then be rotated clockwise 90 degrees so that it may be easily reviewed by an individual electronically. A preprocessing module used within the present invention would simplify the overall process of determining the Figure Pages that are orientated in an undesirable orientation without having to rely upon identifying text within the figures themselves.

iv. Reorganizing Landscape Figure Pages

Even though the orientation setting is modified to "landscape" for the Landscape Figure Pages (e.g. pages 2 and 6 of the '666 patent), the pages will print as they originally were scanned by the government office resulting in a printed version of the patent document that is difficult to review (e.g. pages 2 and 6 of the '666 patent would still be printed with the image rotated counter-clockwise 90 degrees). It is preferable that the printed pages of the patent document all be easily viewed and in an orientation that allows the reviewer to easily read the element numbers, figure labels and the images themselves.

The present invention further preferably modifies the actual image of Landscape Figure Pages so that these pages remain in a "portrait" orientation but the actual image on the page is rotated clockwise 90 degrees thereby resulting in a printed patent document that is easily viewed similar to the electronic version.

Figure 6:
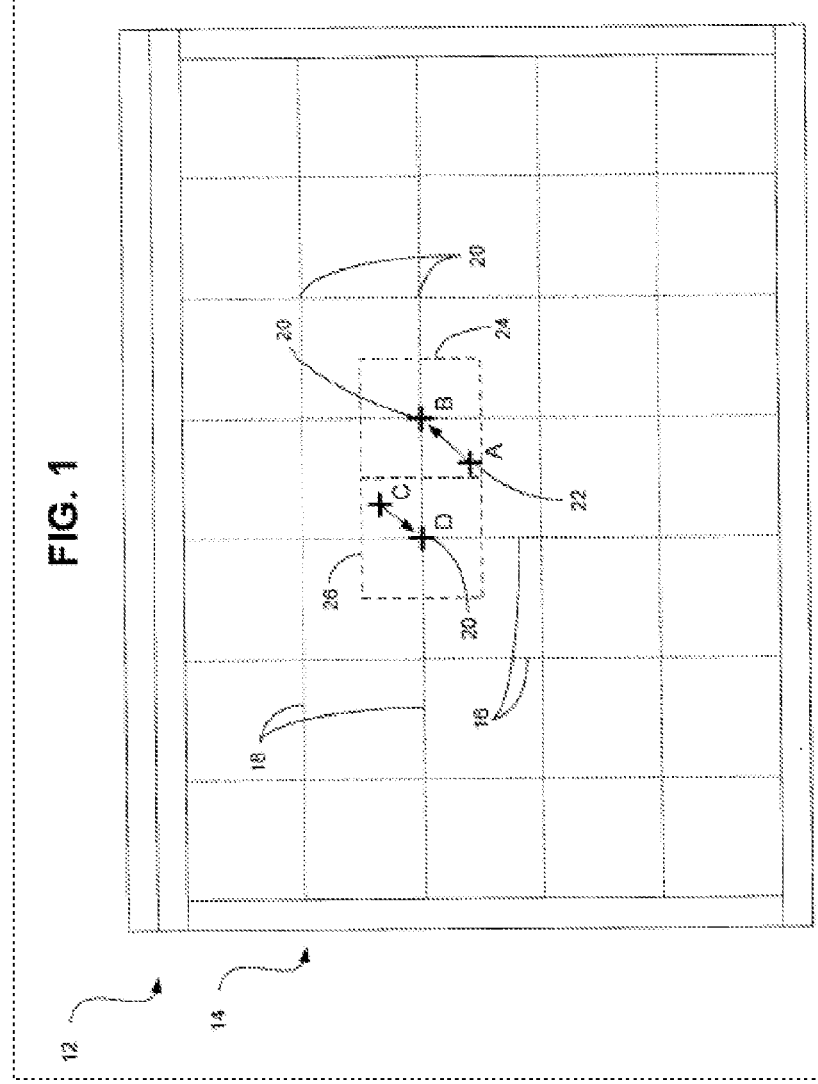
FIG. 6 is a view of page 2 of U.S. Pat. No. 6,545,666 with a dashed line surrounding the image to be rotated within the Figure Page.

After identifying the Figure Pages that are originally formatted in the landscape position (e.g. pages 2 and 6 of the '666 patent), the present invention takes these pages and identifies the image portion on the page which may be done by assuming the margins of the page or by analyzing the locations where no image pixels are located (i.e. white space is identified thereby indicating no image present). The present invention then copies/cuts this selected image area (see FIG. 6) and then pastes the image into a new Figure Page rotated 90 degrees clockwise as shown in FIG. 8 of the drawings. It is preferable that the header information remain on the new Figure Page as shown in FIG. 8 of the drawings. The new Figure Page (FIG. 8) is then added to the patent document image file with the original corresponding Figure Page removed (i.e. this modified figure replaces the figure). It is preferable to have a notification on the modified Figure Page to indicate that this is not an original page of the patent document such as "* Figure Page Modified *" which may be placed at the header or other locations on the page.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

The invention claimed is:

1. A method for correcting orientation of one or more patent figures in a patent image file, comprising the steps of:
   acquiring a patent image file, wherein said patent image file represents a granted patent or published patent application in an electronic file format;
   identifying a figure within said patent image file;
   determining if said figure was originally in a landscape orientation, wherein said step of determining if said figure was originally in a landscape orientation comprises determining a number of characters on said figure when in an original position, rotating said figure 90 degrees to a rotated position, determining a number of characters on said figure when in said rotated position, and determining whether said original position has more identified characters than said rotated position; and
   rotating said figure if said figure was originally in said landscape orientation.

2. The method for correcting orientation of one or more patent figures in a patent image file of claim 1, including the step of performing an OCR process on said patent image file prior to identifying a figure.

3. The method for correcting orientation of one or more patent figures in a patent image file of claim 1, wherein said step of identifying a figure is comprised of identifying figure header text within said patent image file.

4. The method for correcting orientation of one or more patent figures in a patent image file of claim 1, wherein said figure was originally in said landscape orientation if said rotated position has more identified characters than said original position.

5. The method for correcting orientation of one or more patent figures in a patent image file of claim 1, including continuing the above-stated steps for any remaining figures within said patent image file.

6. The method for correcting orientation of one or more patent figures in a patent image file of claim 5, including the step of combining all of the pages into a single image file.

7. A method for changing orientation of one or more patent figures in a patent image file, comprising the steps of:
   acquiring a patent image file, wherein said patent image file represents a granted patent or published patent application in an electronic file format;
   identifying a figure within said patent image file;
   determining if said figure was originally in a landscape orientation;
   wherein said step of determining if said figure was originally in a landscape orientation comprises determining a number of characters on said figure when in an original position, rotating said figure 90 degrees to a rotated position, determining a number of characters on said figure when in said rotated position, and determining whether said original position has more identified characters than said rotated position;
   wherein said figure was originally in said landscape orientation if said rotated position has more identified characters than said original position;
   rotating said figure if said figure was originally in said landscape orientation; and
   performing an OCR process on said patent image file prior to identifying a figure.

8. The method for changing orientation of one or more patent figures in a patent image file of claim 7, wherein said step of identifying a figure is comprised of identifying figure header text within said patent image file.

9. The method for changing orientation of one or more patent figures in a patent image file of claim 7, including continuing the above-stated steps for any remaining figures within said patent image file.

10. The method for changing orientation of one or more patent figures in a patent image file of claim 9, including the step of combining all of the pages into a single image file.

* * * * *